United States Patent [19]
McMurtry

[11] 3,910,721
[45] Oct. 7, 1975

[54] PITCH VARYING MECHANISMS FOR BLADED ROTORS

[75] Inventor: David Roberts McMurtry, Alveston, England

[73] Assignee: Rolls-Royce (1971) Limited, London, England

[22] Filed: Dec. 27, 1973

[21] Appl. No.: 428,714

[30] Foreign Application Priority Data
Jan. 12, 1973 United Kingdom............... 1776/73

[52] U.S. Cl................................. 416/160; 416/26
[51] Int. Cl.² ................................... F03B 3/14
[58] Field of Search ................ 416/25, 26, 27, 160

[56] References Cited
UNITED STATES PATENTS

| | | |
|---|---|---|
| 2,007,417 | 7/1935 | Aivaz.................................. 416/26 |
| 2,207,042 | 7/1940 | Waseige................................ 416/27 |
| 2,432,550 | 12/1947 | Waseige............................... 416/160 |
| 3,672,788 | 6/1972 | Ellinger........................... 416/160 X |

FOREIGN PATENTS OR APPLICATIONS

| | | |
|---|---|---|
| 772,115 | 10/1934 | France................................ 416/160 |
| 99,774 | 9/1940 | Sweden.............................. 416/160 |

*Primary Examiner*—Clarence R. Gordon
*Attorney, Agent, or Firm*—Stevens, Davis, Miller & Mosher

[57] ABSTRACT

In a variable pitch fan gas turbine engine the pitch varying mechanism is, for example, a gear mechanism and a clutch is provided for locking the mechanism when an engine has to be shut down so that the variable pitch blades are driven by rotation of the fan rotor into the feathered position to prevent windmilling of the fan.

4 Claims, 3 Drawing Figures

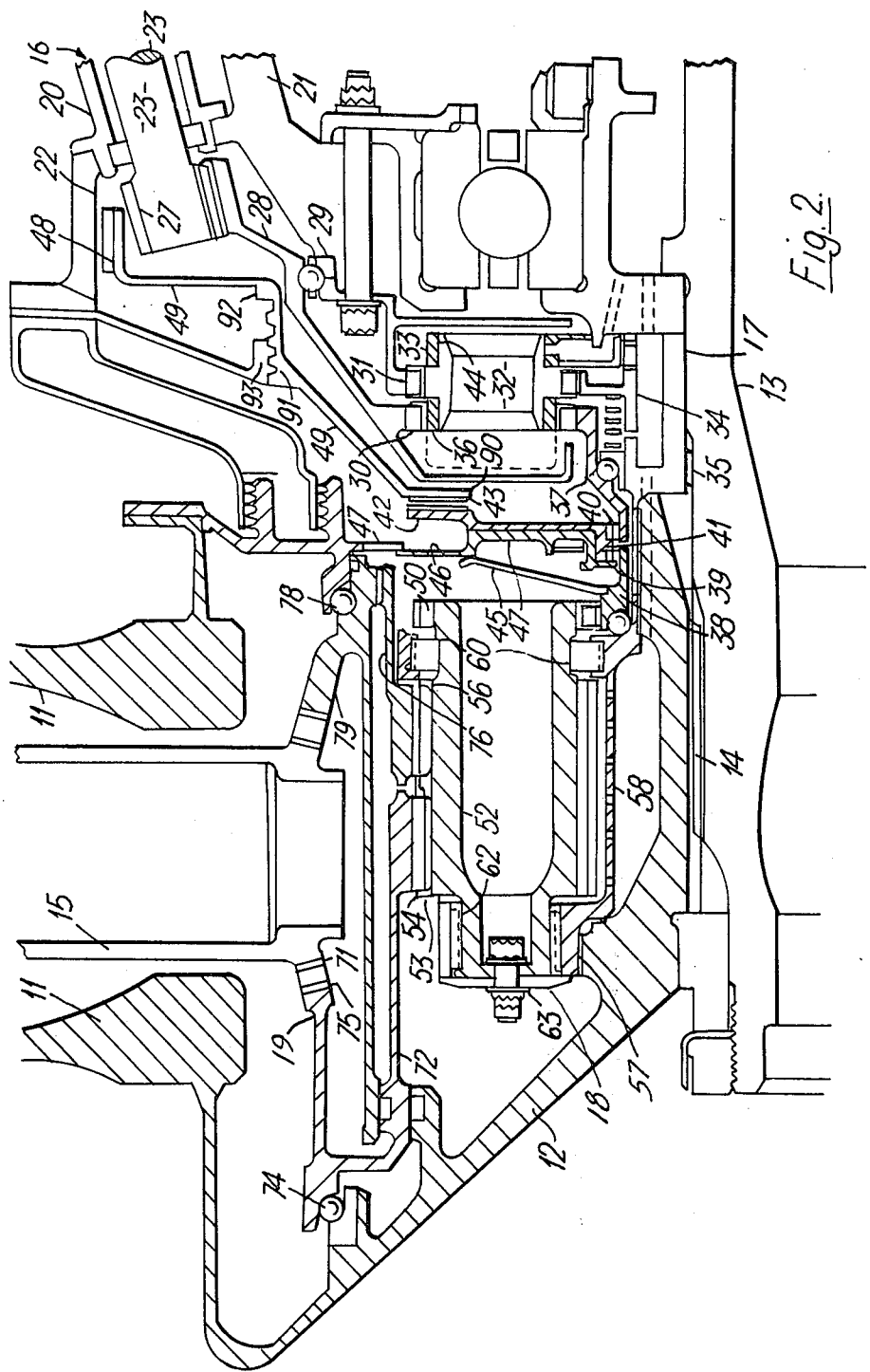

PITCH VARYING MECHANISMS FOR BLADED ROTORS

The present invention relates to pitch varying mechanisms for bladed rotors, and has particular but not exclusive reference to such mechanisms for use with variable pitch fans in gas turbine engines.

The pitch varying mechanisms for variable pitch fan engines have been developed from the principles successfully used in variable pitch propeller technology. The mechanisms so produced have been hydraulic mechanisms and have tended to become relatively complex and heavy and it has become desirable to develop the lighter less compelx mechanisms if the benefits offered by variable pitch fan engines are not to be out-weighed by the additional weight and cost of the mechanism they require for their operation.

In a variable pitch fan engine installed in an aircraft it is desirable that the fan should not be allowed to windmill if the engine has to be shut down in flight; it has hitherto been necessary to use additional mechanisms to feather the blades to prevent windmilling of the fan, and it is an object of the present invention to provide an improved means for feathering the fan blades for preventing or at least substantially reducing said windmilling.

According to the present invention there is provided a mechanism for varying the pitch of the blades of a bladed rotor comprising means selectively operable during rotation of the rotor about its axis to provide a driving connection between the blades and the rotor so that the rotation of the rotor about its axis produces rotation of the blades about respective axes thereof substantially perpendicular to the axis of the rotor.

Also according to the present invention there is provided a mechanism for varying the pitch of the fan blades of a fan rotor of a gas turbine engine which includes means for shutting down the fuel supply to said engine, said mechanism comprising means selectively operable when the fuel is shut down and while the rotor is rotating about its axis, to provide a driving connection between the blades and the fan rotor so that the rotation of the fan rotor about its axis produces rotation of the blades about respective longitudinal axes thereof substantially perpendicular to the axis of the rotor.

In one embodiment of the present invention the mechanism comprises a shaft driving the rotor on which the fan blades are mounted and is characterized by an actuator which is stationary relative to the rotor and which is capable of producing a rotational output corresponding to the degree of pitch change required in the blades, an epicyclic differential gear arranged to be driven by said output and adapted to produce an output corresponding to the sum of the shaft rotational speed and the actuator output, a pitch changing gear adapted to be driven by the output from the differential gear, and to produce rotation of means connected to the fan blades to rotate them about their longitudinal axes to produce said degree of pitch change. Such a mechanism is described and claimed in our co-pending U.S. Pat. application Ser. No. 312,754 now U.S. Pat No. 3,825,370 granted July 23, 1974.

Thus in a specific form of the invention the selectively operable means comprises an actuator operable to engage a clutch arranged to disconnect the output of the differential gear from the sun wheel of the pitch changing gear and to connect the sun wheel to static structure.

The clutch may comprise a pressure plate normally disengaged from a driven plate, the driven plate normally drivingly connecting the output of the differential gear with the sun wheel of the pitch changing gear, characterized in that the pressure plate is engageable with the driven plate by rotating the pressure plate to produce axial movement thereof along a screw threaded connection with static structure and wherein further axial movement of the pressure plate disengages said driving connection between the output of the differential gear and the sun wheel and connects said sunwheel to said static structure through limiting means associated with the screw thread.

An example of the present invention will now be described in more detail with reference to the accompanying drawings wherein:

FIG. 2 is a section through the variable pitch fan engine of FIG. 1 showing the pitch changing mechanism.

Figure 1:
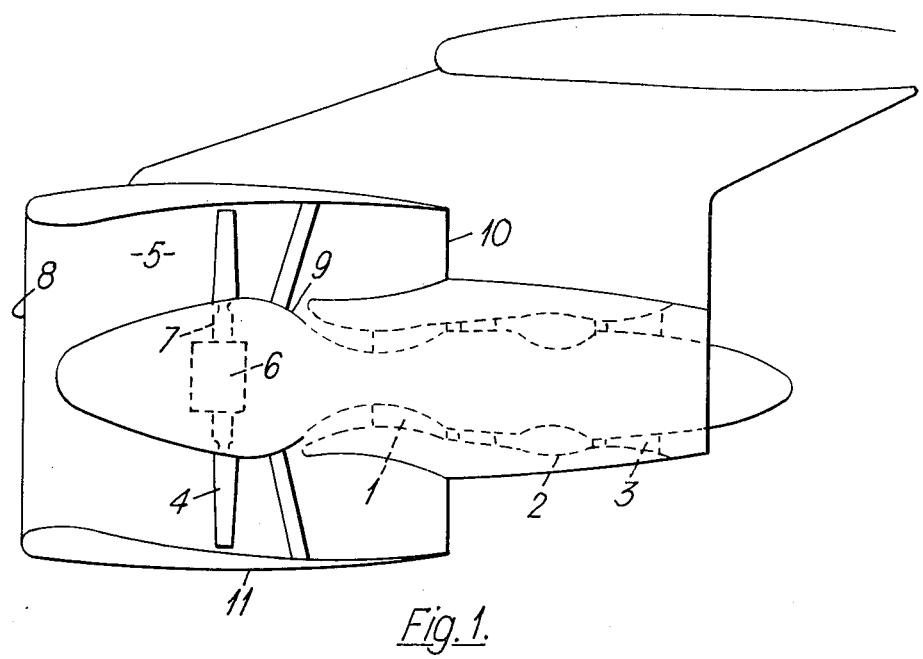
FIG. 1 is a diagrammatic view of a variable pitch fan gas turbine engine.

Referring now to the drawings, in FIG. 1 there is shown a ducted fan gas turbine engine comprising a core engine having compressor means 1, combustion equipment 2, and turbine means 3 all in flow series, and a fan 4, disposed in an annular duct 5. The fan is driven by means of a gear box 6 from the core engine, and the individual blades of the fan are rotatable about their longitudinal axes from a forward thrust-producing position to a reverse thrust-producing position by means of a pitch varying mechanism 7. In the forward-thrust producing position of the fan, air enters the duct through an inlet 8 and part of it flows into the core engine via core engine inlet 9, while the remainder passes to atmosphere through an exhaust nozzle 10.

Referring now to FIG. 2, the fan blades (not shown) are mounted on a rotor disc 11, which is driven through a drive cone 12 from the engine main shaft 13 via a splined connection 14. A torque tube 15 is rotatable about its own longitudinal axis to vary the pitch setting of the blades and rotates with the disc 11.

Figure 3:
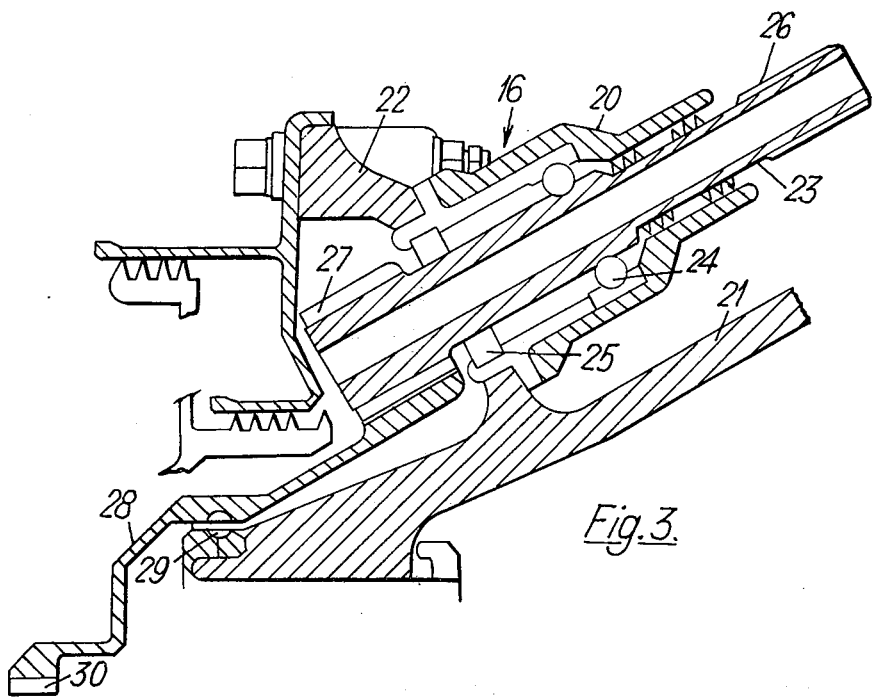
FIG. 3 is a section through the input drive from the motor to the mechanism of FIG. 2.

In FIGS. 2 and 3 the pitch varying mechanism 7 can be seen in more detail, and comprises four parts, (1) an actuator 16 (2) an epicyclic differential gear 17, (3) a pitch changing gear 18 and (4) a fan bevel gear 19. All four parts operate in series to convert an output from a drive motor (not shown), operated for example from a pilot's lever in an aircraft on which the engine is mounted, to movement of the fan blades to change their pitch.

1. THE ACTUATOR (FIG. 3)

This part consists of a body 20, mounted on the exterior of the fan bearing support 21, by means of a mounting flange 22 which also acts as a sump for oil draining from the mechanism. The actuator is thus stationary relative to the fan rotor. A shaft 23 is mounted for rotation in the body by means of bearings 24 and 25. At one end the shaft 23 has splines 26 for connection to the drive motor, and at the other end has a bevel gear 27 for meshing with a corresponding bevel gear on a conical drive shaft 28, which is supported in a bearing 29. The bevel gears are arranged to give a speed reduction of approximately 17 : 1. The shaft 28 carries an annular toothed wheel 30 which forms part of one of the epicyclic trains of the epicyclic differential gear.

The actuator being fixed to the engine casing does not rotate so that the toothed wheel 30 is effectively earthed unless the shaft 28 is rotated by virtue of an input from the drive motor. The actuator and the drive motor which operates the mechanism are all mounted externally on the engine giving easy access for maintenance purposes.

2. THE EPICYCLIC DIFFERENTIAL GEAR

This gear includes two gear trains. One of the trains comprises an annulus gear 31 earthed to static structure, and meshing with a plurality of planet wheels 32 carried in a cage 33, and which mesh in turn with a sun wheel 34 splined at 35 to the engine main shaft.

The other of the trains, which is slightly axially displaced from the first train, comprises the annulus gear 30 which meshes with another row of identical planets 36 carried by the same cage 33.

The planets 36 mesh in turn with a second freely rotatable sun wheel 37 which is itself drivingly connected to a further sunwheel 38 which engages with gear teeth 50 on the planets of the pitch changing gear 18. The driving connection between the sun wheels 37 and 38 is by splines 39, 40 formed on each sun wheel 37, 38 respectively. The splines 39 engage internal splines 41 on the driven plate 42 of a clutch 43 later described.

The planets 32 of the epicyclic differential gear are supported by plain bearing surfaces 44 on the cage and the cage is split along its transverse center line and bolted up between the planets.

The operation of the differential gear is as follows:

a. In the steady state condition, (i.e., when there is no input from the input gear), both annulus gears are effectively earthed. The main shaft drives the sun wheel 34, and the cage with both groups of planets rotates about the engine shaft with an angular velocity approximately half that of the shaft, the sun wheel 37 rotating at shaft speed.

b. When an input is fed from the actuator to the annulus gear 30. Since the speed of the cage is already defined by the planets 32 meshing between annulus 31 and sun 34, the input has the effect of speeding up or slowing down the rotation of the planet wheels 36 about their own axes, and this effect is transmitted to the sun wheel 37. The increase or decrease in speed of the sun wheel 37 is superimposed on the steady state condition described above, and acts as an input to the pitch changing gear. The proportions of the elements of this epicyclic gear give a speed increase between the annulus 30 and the sun wheel 37 of the order of 4/3.

3. THE PITCH CHANGING GEAR

This consists basically of the sun wheel 37, a plurality of planet wheels 52, and the annulus gears 54 and 56 which provide outputs to the fan bevel gear.

The planet wheels are held in a cage 57 which is made in the form of an annular member having a channel section and wherein the open side of the channel faces radially outwardly. This construction of the cage provides strength in the cage, and is achieved by positioning the teeth 50 on the end of the planets so that they are overhung from the bearing 60. This enables the cage to be made in one piece with no slots in the web 58 of the channel section.

An additional feature of the pitch changing gear construction is that although the two annulus gears 54 and 56 have different numbers of teeth, the teeth 53 of the planet wheel extend continuously from one end of the planet to the other. This means that they can be grounded accurately in one operation. The meshing with the two annulus gears is achieved by using different pitch circle diameters and allowing the teeth to mesh at different pressure angles. In fact, in the example illustrated eight plants are provided and there are eight more teeth on annulus gears 54 than on annulus gear 56.

The planets are supported on roller bearings 60 at one end and needle roller bearings 62 at the other end and are retained by a nut 63. The net bearing load, from the centrifugal loads and tooth loads, is approximately tangential to the cage.

The operation of the pitch changing gear is as follows:

a. In the steady state, the fan rotor and blades are rotated by the main shaft 13 via splines 14 and drive cone 12. The torque tube 15 is carried round by the rotor and this drives the whole pitch changing gear assembly at shaft speed. Since the sun wheel 37 is driven at shaft speed by the differential gear during steady state running, there is no rotation of any of the parts of the pitch changing gear relative to the shaft and therefore no load tending to rotate the fan blades.

b. When an input is fed in to the sun wheel 37 via the epicyclic differential gear, the sun wheel 37 rotates at a greater or lesser speed than the shaft. The effect of this is to turn the planet wheels 52 on their own axes, and because these mesh with annulus gears with different numbers of teeth, relative rotation is produced between the two annulus gears to drive the fan blades around on their own axes. The torque tubes 15 can only rotate on their own axes because they are fixed to the fan blades. The numbers of teeth, and the proportions of the elements of the pitch changing gear are such as to produce a speed reduction of 58 : 1 between the sun wheel 37 and the annulus gears 54 and 56.

4. THE FAN BEVEL GEAR

The fan blades are rotated by the torque tube 15 which has at its radially inner end a fan bevel gear 71. The annulus gear 54 has a cylindrical extension 72 extending axially therefrom, which is supported in a bearing 74, and which carries a bevel gear 75 for meshing on one side with the fan bevel gear 71. Similarly the annulus gear 56 has a cylindrical extension 76 which is supported in a bearing 78 and which carried a bevel gear 79 which meshes on the opposite side with fan bevel gear 71. Thus relative rotation of the annulus gears 54 and 56 causes equal and opposite rotations of the fan bevel gears 75 and 79 which cause rotation of the torque tubes and hence the fan blades.

There is in fact a step up gear ratio between the pitch changing gear and the fan bevel gear of approximately 5 which reduces the overall reduction between the actuator and bevel gears, but with the embodiment thus described an overall reduction of approximately 142 : 1 can be achieved.

The overall system is, therefore, robust and lightweight and because the power is transmitted at all stages through gearing, the mechanism also provides a feedback signal to indicate the angular position of the fan blades at any instant. The actuating motor is controlled by a servo mechanism (not shown) which receives the feedback signal and controls the motor actuation accordingly.

With the gear drive of the present invention the problem of feeding a pitch change signal from a static structure, i.e. the pilot's lever, to the rotating system of the fan rotor is overcome.

THE CLUTCH

A clutch 43 is provided between the epicyclic differential gear and the pitch changing gear. The clutch comprises a driven plate 42 normally rotating with and drivingly connecting the sun wheels 37, 38 by means of splines 41. The splines 41 are maintained in engagement with the splines 39, 40 of the sun wheels during operation of the engine by a spring 45 urging a flange 46 on the driven plate against a flange 47 attached to the rotor disc 11. The flanges 46 and 47 are both rotating at shaft speed when the epicyclic differential gear is not being driven by the actuator 16 and there is therefore no relative rotation between them. During operation of the actuator there is however a small amount of relative rotation between the two flanges.

If for any reason during the flight of an aircraft in which the engine is installed it becomes necessary to shut the engine down, the fuel supply to the engine may be stopped and a second actuator (not shown) but similar in detail to the actuator 16 may be used to rotate a gear 48 attached by a shaft 49 to the pressure plate 90 of the clutch 43. The shaft 49 is connected by screw threads 91 to static structure of the engine and rotation of the shaft therefore axially advances the pressure plate 90 until it engages the driven plate 42 from which it is normally disengaged. Further rotation of the shaft 49 will disengage the splines 40 of the sun wheel 37 from its splined connection 41 with the sun wheel 38 of the pitch changing gear. Yet further rotation of the shaft 49 will continue until a stop 92 on the shaft engages a stop 93 on the static structure at which point the rotation of the actuator will cease and the stops which limit the travel of the pressure plate along the screw thread will also connect the sunwheel 38 to static structure. Thus the sun wheel 38 will slow down rapidly while the clutch slips. Rotation of the rotor about the rotor axis will now drive the annulus gear at a greater speed than the sun wheel 38 and this speed differential provides, through the pitch changing mechanism, a driving connection between the blades and the rotor so that rotation of the rotor causes rotation of the blades about axes substantially perpendicular to the axes of the rotor.

Prior to engaging the clutch the fuel supply to the engine is shut off, and in this state the forces trying to rotate the fan rotor apart from its own inertia, are due to the forward air speed of the aircraft trying to windmill both the fan and the turbine of the rotor shaft. The forces trying to windmill the fan change as the pitch of the blades changes and will reverse as the blades pass into reverse pitch. Thus the rate of rotation of the fan about the rotor axis will slow down due to the drag of the blades as they rotate about their respective axes until they settle in a feathered position in which the forces acting on the fan balance the windmilling torque acting on the turbine. The fan rotor is now substantially at rest and any deviation from this position is resisted by the consequent change in the pitch of the blades. Thus the inter-connection between the fan and the pitch change mechanism prevents windmilling of the fan.

It will be appreciated that in this embodiment the clutch forms a means operable on the mechanism for varying the angles of attack of the blades of the fan so that rotation of the rotor about its axis produces rotation of the blades about respective axes substantially perpendicular to the axis of the rotor.

Clearly, variations in the elements of the mechanism may be employed without departing from the scope of the invention.

The number of planet wheels in the pitch changing gear may be different from the number quoted above. The number of teeth and proportions of the elements of the various gear trains may be changed to give optimum gear ratios for minimum weight with maximum strength.

The mechanism may be constructed so as to be a self-contained module, except for the actuator, with its own oil supply, thus necessitating a re-positioning of the various seals and bearings. It will be further appreciated that mechanism, other than the one described for varying the angles of attack of the blades of a bladed rotor e.g., hydraulic, may be provided with a means operable thereon, so that rotation of the rotor about its axis produces rotation of the blades about respective axes substantially perpendicular to the axis of the rotor.

We claim:

1. A pitch varying mechanism for a variable pitch fan in which a plurality of fan blades are mounted on a rotor and a rotational shaft is provided for providing a drive to the rotor and wherein the mechanism comprises:

an actuator which is mounted stationary relative to the rotor and which is operable to produce a rotational output corresponding to the degree of pitch change required in the blades;

an epicyclic differential gear having two input gears one of which is driven by the shaft and the other of which is driven by said rotational output, and having an output corresponding to the sum of the shaft rotational speed and the actuator rotational output;

a pitch changing reduction gear having a pair of output gears and an input, the input corresponding to the output of the epicyclic differential gear, the output from the pitch changing reduction gear being in the form of relative rotation of the two output gears; means connecting the output gears with each fan blade to rotate the blades about their longitudinal axes to vary their pitch, and further means selectively operable when the drive to the rotor stops for feathering the fan blades, said means comprising a clutch having two parts which are normally disengaged and which are adapted to be engaged and to disconnect the output of the differential gear from the pitch changing reduction gear and to connect the input of the pitch changing reduction gear to static structure.

2. A pitch varying mechanism according to claim 1 wherein one of the two parts of said clutch is on a driven member and the other is on a movable interconnecting member which normally interconnects the output of the differential gear with the input of the pitch changing reduction gear, operation of the selectively operable further means causing the driven member to move to cause engagement of the two parts of said clutch.

3. A pitch changing mechanism according to claim 2 wherein further movement of the driven member after the clutch parts are engaged causes movement of the movable interconnecting member to disengage it from the output of the differential gear and to engage it with static structure.

4. A pitch changing mechanism according to claim 2 wherein the driven member is supported in a screw-thread so that rotation of the driven member causes axial movement of the driven member to cause engagement of the clutch.

* * * * *